S. DOUBET.
CAR COUPLING MECHANISM.
APPLICATION FILED JAN. 27, 1917.
1,355,822.
Patented Oct. 19, 1920.
3 SHEETS—SHEET 1.
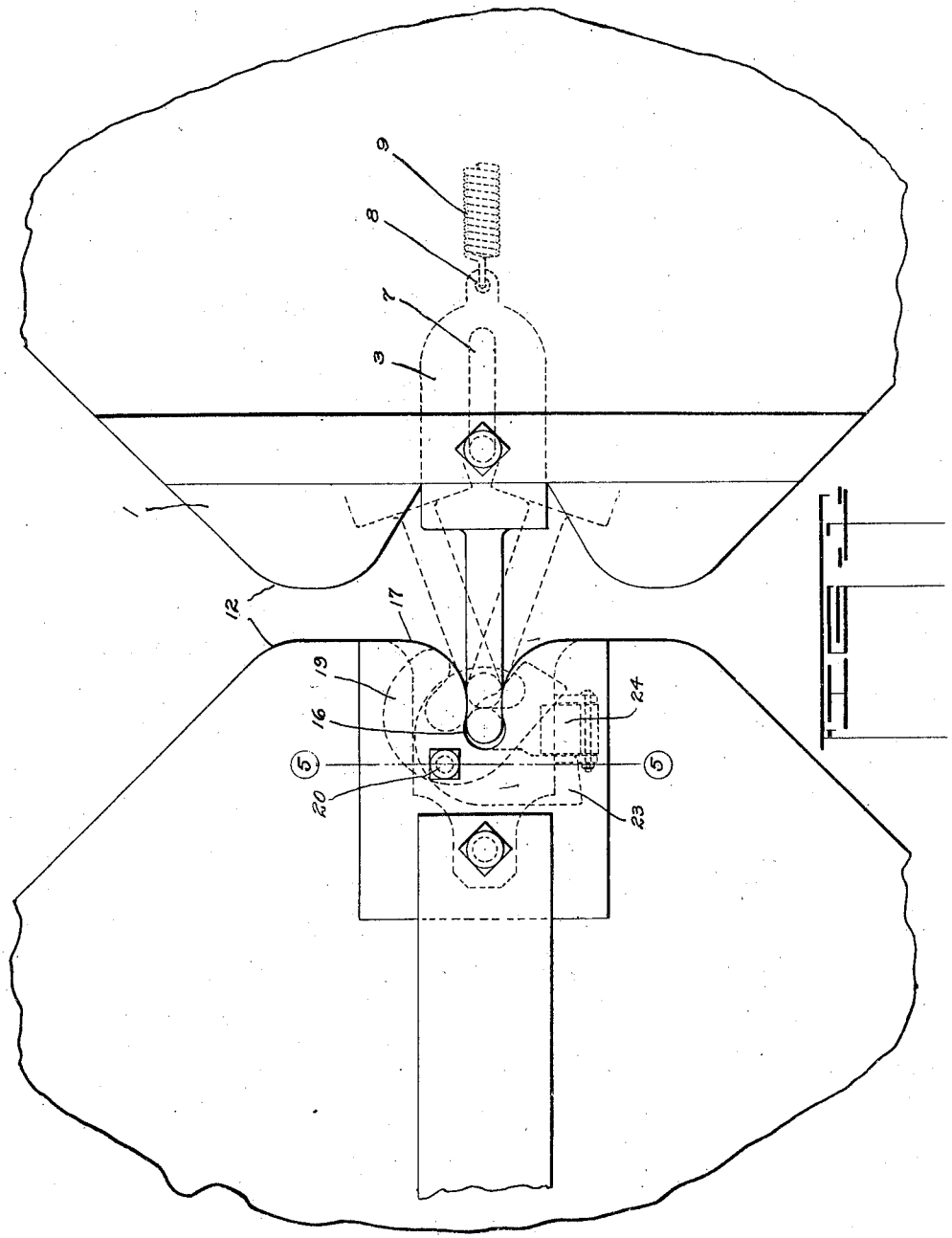
INVENTOR
By Sylvester Doubet
LaPorte - Bean
Atty's

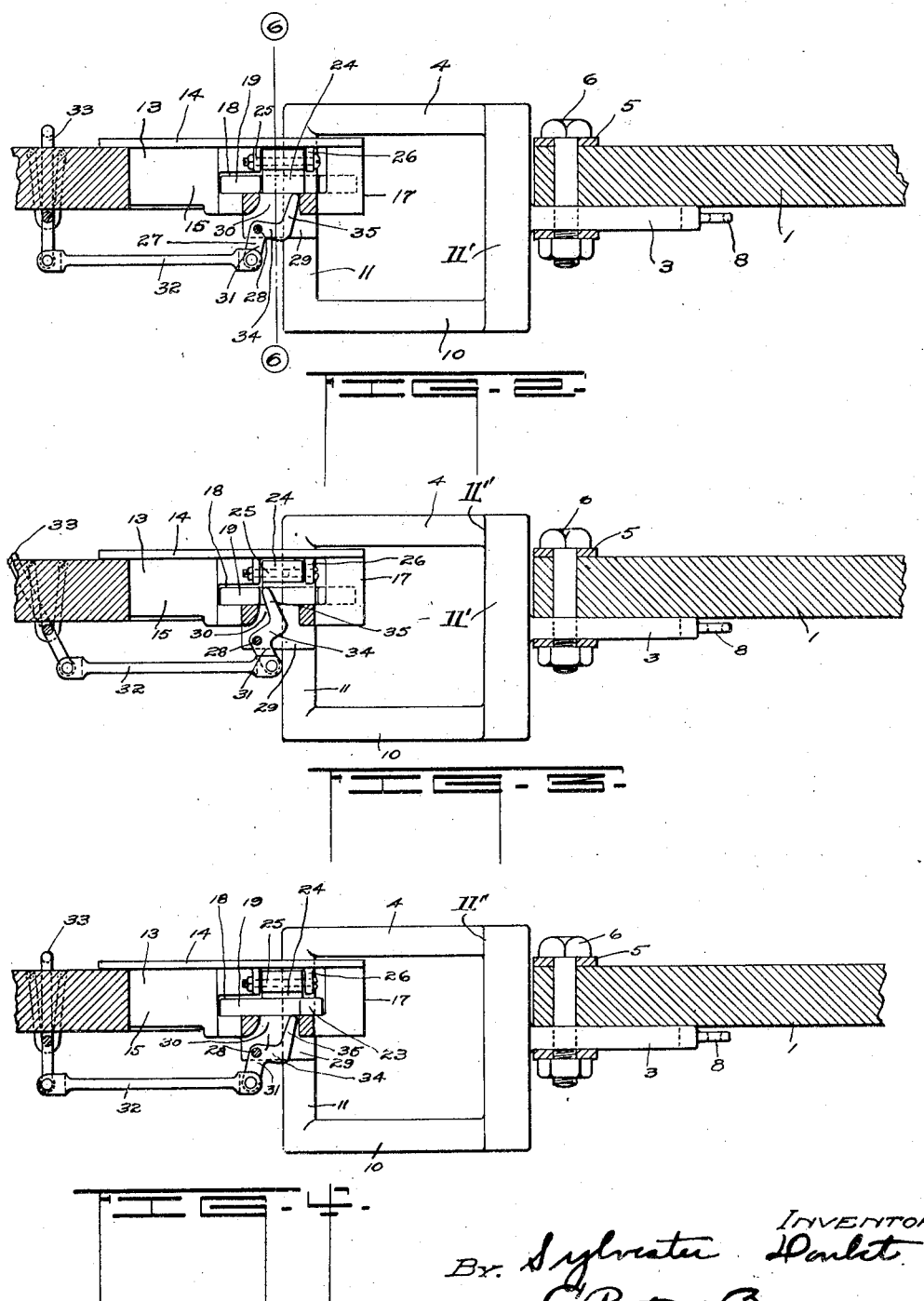

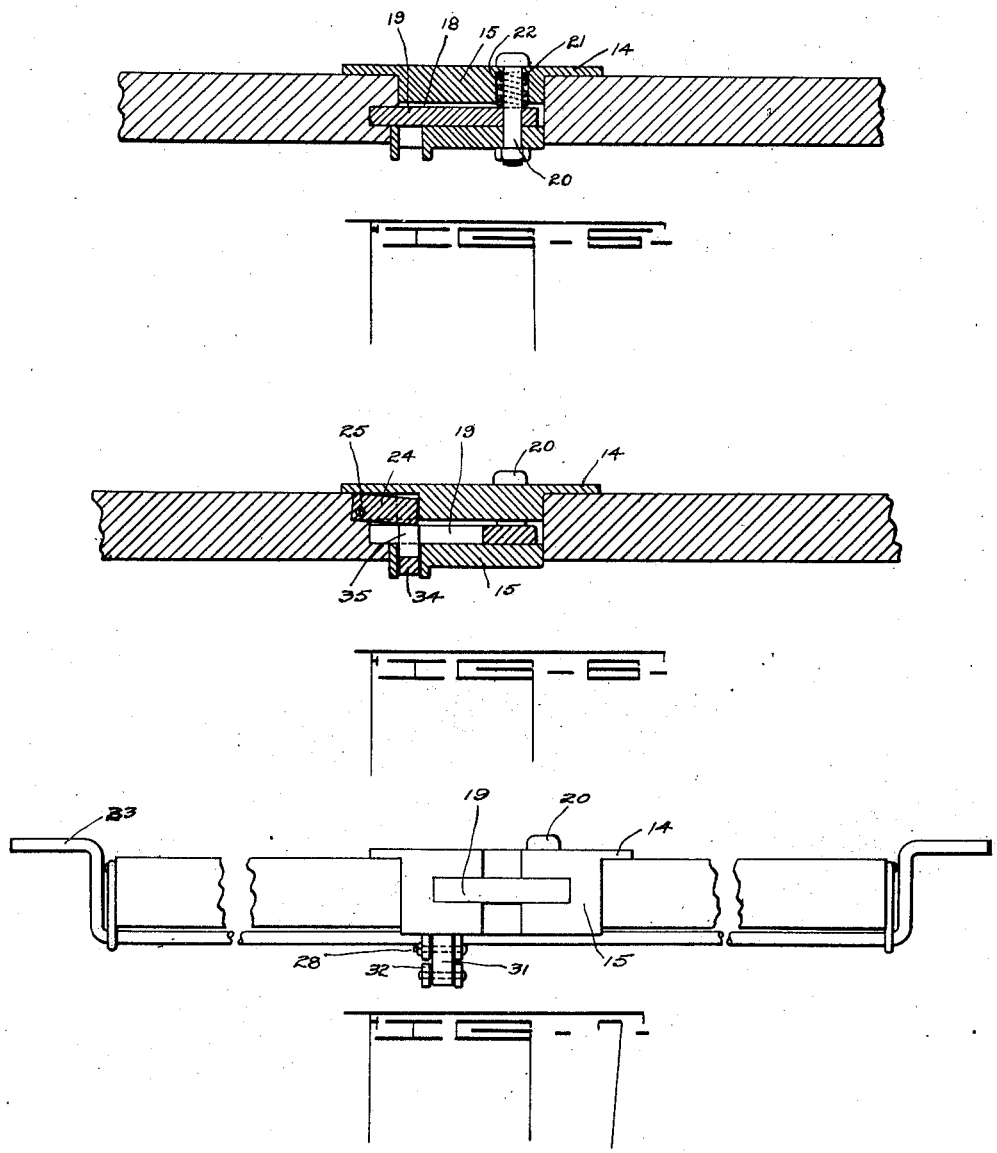

UNITED STATES PATENT OFFICE.

SYLVESTER DOUBET, OF PEORIA, ILLINOIS.

CAR-COUPLING MECHANISM.

1,355,822.   Specification of Letters Patent.   Patented Oct. 19, 1920.

Application filed January 27, 1917. Serial No. 144,884.

*To all whom it may concern:*

Be it known that I, SYLVESTER DOUBET, a citizen of the United States, a resident of Peoria, in the county of Peoria and State of Illinois, have invented new and useful Improvements in Car-Coupling Mechanism, of which the following is a specification.

This invention relates to improvements in car coupling mechanism and is particularly adapted for use in connection with mine cars and the like, and in fact in connection with any cars which are coupled at the same end.

The principal object of my invention is to provide a coupling which will automatically operate to lock adjacent cars together regardless of the angle at which the cars meet, or of variation in the relative height of the cars and the parts of the coupling mechanism.

Another important object of this invention is the provision of such a device, in which the coupling parts are locked positively when in coupling relation, and which may be released by the operator, and when released, remain in that condition until the parts are uncoupled or are coupled together again.

A further object of my invention is the provision of such a device which is simple in construction and efficient in operation, being composed of few parts which will not get out of order readily and which may be readily replaced or repaired.

To the accomplishment of the foregoing, and such other objects as may hereinafter appear, my invention consists in the construction, combination and arrangement of parts hereinafter described and then sought to be defined in the appended claims, reference being had to the accompanying drawings forming a part hereof and which show merely for the purpose of illustrative disclosure, a preferred embodiment of my invention, it being expressly understood, however, that various changes may be made in practice within the scope of the claims without digressing from my inventive idea.

In the drawings:—

Figure 1 represents a plan view of the meeting ends of two adjacent cars, equipped with coupling devices embodying my invention; different positions being indicated by dotted lines;

Fig. 2 is a side elevation of the coupling parts in coupled relation, parts being shown in section to facilitate disclosure;

Fig. 3 is a view similar to Fig. 2 showing the locking dog tripped and held in the released position;

Fig. 4 is a view similar to Fig. 2 showing the hook in its uncoupled position;

Fig. 5 is a transverse section on line 5—5 of Fig. 1;

Fig. 6 is a transverse section on line 6—6 of Fig. 2;

Fig. 7 is an end elevation of the coupling, partly broken away.

Throughout the drawings like characters of reference are used to refer and designate the same parts.

Broadly and generally speaking, this invention is designed to provide a coupling mechanism which will permit the cars to couple at wide and various angles and with considerable variation in the relative heights of the bodies of the car or of the coupling parts, and which will also permit the turning of the cars on a sharp curve without the danger of derailment. The coupling parts themselves are so constructed that when in coupled position and locked, they are securely held against release from jarring or relative movement of the cars, and when the locking dog is released, it is held in that position until the cars are uncoupled. To accomplish these various advantageous results, the following mechanism is provided.

Referring now to the drawings, the numeral 1 designates the draw bar end of a car platform on the underside of which is mounted the shank 3 of the coupling clevis. Suitable brace members 5 are provided and connecting these brace members is the bolt member 6 which passes through the elongated slot 7 in the shank of the clevis member. To the rear end of the clevis member, as at the eye 8, is connected the spring member 9 which is also connected to the body of the car, this bolt and slot and spring connection permitting the pulling out and also the turning of the clevis or draw bar relative to the car. The coupling end of the clevis is formed with the spaced horizontal members 4 and 10 connected by the vertical member 11 which is of considerable length as shown, and is adapted to be engaged by the coupling hook which will be described hereinafter. This coupling link therefore comprises the elongated and vertical end member 11 and the horizontal members 4 and 10 leading therefrom to the rear member 11'. This rear member as seen in Fig. 1, is considerably wider than the horizontal members 4 and 10 and therefore provides an extended shoulder or surface 11'', which is adapted to abut or engage the end of the frame or body of the car and the brace members so that the link member also serves as a bumper and obviates the necessity of using metallic ends on the cars for bumpers. The ends of the car are provided with the suitable bumpers 12 as is customary.

The other part of the coupling mechanism is mounted on the other end of the car and includes the frame member 13 having the flat top flange portion 14 and the substantial body portion 15. This body portion 15 is provided with a vertical slot or recess 16 having the flared entrance portion 17. This body portion 15 is also provided with the horizontal slot 18 extending entirely therethrough and which is adapted to receive the coupling hook member 19 which is pivotally connected to one side of the vertical slot or recess 16 by means of the bolt 20. This bolt 20 is provided with the expansion spring 21 located in a recess 22 in the body 15 which will hold the hook member 19 in its various adjusted positions. This hook member 19 is provided with a substantially elongated shank portion 23, which, when in coupled position extends laterally relative to the body portion 15, as shown in dotted lines in Fig. 1, and it is against this shank portion 23 that the locking means engages.

This locking means includes the locking dog 24 pivotally mounted as at 25 to the spaced flange members 26 depending from the top flange 14 of the frame member. This pivot 25 is located near the outer edge of the top flange 14 so that the locking dog extends inwardly toward the coupling hook member. Also when the locking dog is in raised or released position, it is flush with the upper surface of the horizontal slot 18 which is provided in the body portion. This locking dog is adapted to drop by gravity in front of the shank portion 23 of the hook member when the same is in its coupled position as indicated in Fig. 2 of the drawing and therefore forms a secure lock preventing the uncoupling of the mechanism.

The means for releasing the locking dog from its locking position includes the tripping lever 27 which is pivotally mounted, as at 28 between the spaced flange members 29 on the lower part of the body portion. This tripping lever is located in a vertical position and operates in the vertical slot 30 along the side of the body portion of the frame. The peculiar construction of this tripping lever 27 is clearly shown in Figs. 2, 3 and 4 of the drawings. It has the straight portion 31 extending from its pivot to the end to which the operating link 32 is pivotally connected. This operating link 32 is actuated by the usual operating lever 33 which extends to the sides of the car and is provided with handles or cranks for the convenience of the operator. The tripping lever extends at right angles on the other side of the pivot, as at 34 and has an engaging portion 35 extending at substantially right angles thereto, these last mentioned parts being of such length that they will engage the locking dog when in locked position, and when the actuating lever 33 is moved, the tripping lever will be swung on its pivot from the position shown in Fig. 2 to that shown in Fig. 3, raising the locking dog until it lies flush with the upper wall of the horizontal slot 18. In this position, the end of the tripping lever is located at the junction of one wall of the recess in which the locking dog rests with the upper wall of the horizontal slot, and a sufficient portion of the end thereof engages the locking dog so as to support the same in its unlocked position. When in this position, the engaging end of the tripping lever, being off-set as shown and described, is off-center, and the parts are held in the position shown in Fig. 3, due to this arrangement, the frictional engagement of the locking dog with the tripping lever and also the resistance of the operating link and actuating lever. Due to this construction, the tripping lever is securely held as stated, until the parts are uncoupled.

When this occurs, the shank 23 of the hook member 19, is swung forward and engages the portion 35 of the tripping lever and moves the same across the bottom of the locking dog. When the parts reach the position where the tripping lever falls away from the locking dog, the locking dog rests on top of the shank 23 and is supported thereby. This is true in the complete uncoupled condition shown in Fig. 4 so that the locking dog cannot fall down behind the shank, and will not fall down behind the shank until the hook member 19 is swung on its pivot in coupling.

This construction results in providing a positive lock when the parts are in coupled position and for an efficient release when the releasing means is actuated by the operator, the releasing means remaining in a released position until the parts are uncoupled. The coupling is secured at all times regardless of the stress and strains of operation and the various relative movements between the parts. The manner of constructing the clevis and mounting the same insures coupling regardless of the angular position of the car and of their relative heights to each other. This construction is a manifest improvement in this art and will eliminate numerous accidents and delays which are at present customary.

When the strain and pull ceases, the clevis is drawn to its normal position by means of the spring, so that the car can safely enter the shaft and will not project beyond the sides of the adjacent car, which projection might result in the endangering of life and property.

What I claim is:—

1. In a mine car coupler, in combination, a coupling member having an elongated vertically disposed bumping end portion, a yoke formed integrally with said end portion and comprising horizontally disposed spaced bars extending forwardly from the upper and lower ends of said end portion and in cross section considerably thinner than the width of said end portion, said horizontal bars connected by a vertical bar of similar thickness in cross-section, and a shank connected to said end portion, and comprising a slotted bar disposed midway between said end portion and extending rearwardly therefrom.

2. In a mine car coupler, in combination, an open rectangularly shaped coupling member, including an upstanding elongated bumping end having greater width than thickness, spaced horizontal bars extending forwardly from the upper and lower ends of said upstanding bumping end and connected by a vertical end bar, said horizontal bars extending forwardly from said upstanding bumping end at a point midway of and spaced from the sides of said upstanding end, and a shank portion extending rearwardly from said upstanding bumping end and connected therewith midway between the upper and lower ends thereof.

3. In a mine car coupling, in combination, one part having an elongated upstanding bumping end portion, with a yoke extending forwardly thereof, and a shank extending rearwardly thereof, said yoke being approximately the same height as said bumping end but of less width; the other part of said coupling, comprising a hook, locking means therefor, and means for actuating said locking means.

4. In a mine car coupler, in combination, a coupling member having an elongated upstanding bumping end portion, and a yoke extending forwardly thereof, said yoke being approximately the same height as said bumping end to permit the coupling therewith of a hook when there may be a variation in the height of the coupled cars, said yoke, however, being of less width than said bumping end, a shank connected to said bumping end midway between its ends and extending rearwardly thereof, a hook adapted to connect with said yoke, means for locking the hook when in coupled position, and means for actuating said locking means.

SYLVESTER DOUBET.